Nov. 16, 1971  G. PAHLITZSCH  3,619,880
CIRCULAR SAW BLADES OR SIDE-MILLING CUTTERS
WITH TEETH OF FACET DESIGN
Filed March 25, 1969

United States Patent Office 3,619,880
Patented Nov. 16, 1971

3,619,880
CIRCULAR SAW BLADES OR SIDE-MILLING CUTTERS WITH TEETH OF FACET DESIGN
Gotthold Pahlitzsch, Braunschweig, Germany, assignor to National Twist Drill and Tool Company, Canton, Ohio
Filed Mar. 25, 1969, Ser. No. 838,721
Claims priority, application Germany, Nov. 28, 1968, P 18 11 374.1
Int. Cl. B26d 1/12, 1/00
U.S. Cl. 29—103         1 Claim

ABSTRACT OF THE DISCLOSURE

This invention concerns improved cutting teeth for circular disk shaped tools such as circular saws or side-milling cutters for cutting or slot-milling or for key-way milling of metallic material. The cutting teeth include bevels or facets arranged symmetrically relative to the saw blade middle plane so that the corners of the cutting surface are trailing behind the composed principal cutting edges in the cutting direction and are essentially reinforced through the cutting and clearance angle which is altered over the original principal cutting edge, and that guiding planes are formed at the secondary cutting edges which are lying in parallel with the saw blade middle plane.

BACKGROUND OF INVENTION

For circular saw blades and side-milling cutters which are used for cutting, slot milling or key-way milling of metallic materials and in particular of simple steel or alloy steel different forms of embodiment of saw and milling cutter teeth have already become known in practice. These are mainly distinguished in the profile of the back of tooth and the therewith connected form of the tooth gap space (e.g. angularly and curved-teethed circular saw blades or backed-off and point-teethed milling cutters).

Their application as well as the selection of optimum cutting and clearance angles are mainly depending on the respective machine-ability of the material to be removed by cutting and its dimensions, too. Moreover for circular-saw work, preferably for the cutting of plain steels and alloy steels, saw blades with stocking and reaming teeth and such ones with so-called "hard-ground" (Hartschliff) are used. The advantage of such a saw blade embodiment is to be seen in the reduced friction between the compressed steel cuttings and the secondary surfaces of cut.

The arrangement of pairs of teeth consisting of narrow and high rough-cutting teeth and wide and low reaming teeth enables a tri-equipartition of the total cutting width, the principal cutting edge lengths of the individual teeth being selected so that principal and secondary cutter-tooth are each time removing one half of the total cutting cross-section. Symmetrically relative to the middle plane of the saw blade are then formed at the rough-cutting tooth one and at the reaming tooth two chips. The arrangement of pairs of teeth with alternately reduced tooth-widths ("hard ground") at equal tooth-height renders possible a bipartition of the total cutting width, the principal cutting edge lengths of the individual teeth likewise to be selected so that each tooth cuts about one half of the total cutting cross-section. Since the cutting cross-sections of the teeth which are successively penetrating into the material to be removed by cutting are alternately lying right or left of the middle plane of the saw blade there is, contrary to saw blades with rough-cutting and reaming teeth and such ones with cutting width distribution, occurring an unsymmetrical stress of the teeth and the whole saw blade through the cutting force or their components respectively.

With circular saw blades having cutting width distribution, as well as without cutting width distribution, and with straight-toothed side-milling cutters, too, an extremely high stress of the principal and secondary cutting edges as well as the corners is occurring upon impingement of the tooth on the material to be removed by cutting. Thereby the extent of stress of the cutting edges and corners is frequently determined by the striking conditions of the saw or milling-cutter teeth which are depending on the respective position of the workpiece relative to the saw blade or side-milling cutter as well as the respective geometrical shape and the properties of the material of the workpieces. Beyond that the tool bending--oscillations produced by the periodical change of the cutting force components are leading to an undesirable additional stress of the principal and the secondary cutting-edges as well as their corners. Before all with large tool and small spring flange diameters disk-shaped tools are tending to bending oscillations.

The occurrence of oscillations, in particular with circular saw blades, does not only reduce the edge life due to increased wear and tear but leads also to an impairment of the quality of the cutting surface as well as a loss of workpiece material, and a rise in the cutting and feeding efficiency, corresponding to the width of the cutting groove which is becoming larger proportional to the bending oscillations. This is particularly troublesome with materials having a high strength, tenacity and hardness. Such materials e.g. high-alloyed steels are therefore no longer economically to be cut or milled respectively with teeth of high-speed steel tool (e.g. high-speed steel tool—segment saw blades). Such teeth are, after a few cuts already, destroyed within the range of the cutting-edge corners to such an extent that a re-grinding becomes necessary.

In order to improve the economy of the circular sawing and milling operations by means of side-milling cutters. With the tooth shape according to this invention, tipped circular saw blades and side-milling cutters were developed with the aim to utilize the high wearability of the carbide metals also for these cutting processes. The limited resistance to shock and bending of the carbide metals, however, was opposed to a successful application of carbide-tipped circular saw blades on cutting materials of high strength, hardness and tenacity.

Due to unfavourable striking conditions and saw blade oscillations, mainly at the cutting-edge corners, unduly large outbreakings occurred which terminated the edge life of the saw blades very early. It is true, a certain improvement of the edge life could be reached by enlarging the lip angle by means of negative cutting angles; however, also here outbroken cutting-edge corners occurred very often.

SUMMARY OF THIS INVENTION

In order to avoid the afore-said disadvantages it is now proposed a tooth shape according to the solution as per invention with which by applying a bevel-shaped cutting and clearance distribution a cutting wedge, different as to size and position is produced for each principal cutting-edge section which is newly coming into being.

Certainly it is known that for saw blades with rough-cutting and reaming teeth and saw blades with the so-called "hard ground" more than one main clearance space is used; however, this free space arrangement serves solely a useful cutting width partition. However, an improvement of the operative cutting wedges with regard to shape, position and chip flow can hereby not be obtained, the more so as then the greatest stress when cutting falls to the cutting-edge corner which is engaged simultaneously with the principal cutting-edge. Beyond that the practical experience confirms that also these prior art saw blades show the aforementioned disadvantages.

The drawings show one improved tooth shape made according to this invention.

Figure 2:
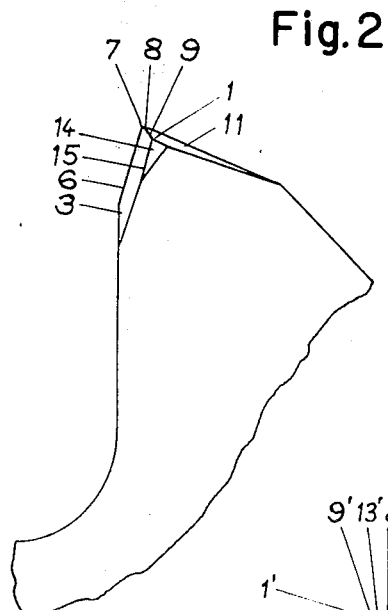
FIG. 2 is a side elevation of the tooth of FIG. 1 as it would be viewed in a direction along the axis of rotation of the cutter.

With the tooth-shape according to the invention, however, the stresses of the endangered cutting-edge corners 1 or 1' respectively (definition of the cutting-edge corner according to DIN 6581: cutting surface area in which principal and secondary cutting edges are meeting). DIN 6581 stands for German industrial standard No. 6581, an industrial standard published under the authority of the West German Government, are reduced through a facetted-shaped arrangement of face 4, flank face 10 and secondary flank faces 12, and the respective slanting faces 3, 5, 11 and 14.

Figure 4:
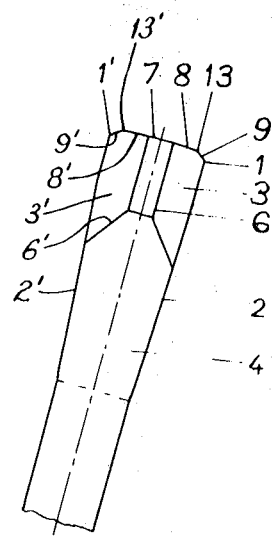
FIG. 4 is a front elevation view of the tooth shown in FIG. 1 as it would appear from the left side of the tooth shown in FIG. 1 looking toward the right in that view.
Figure 1:
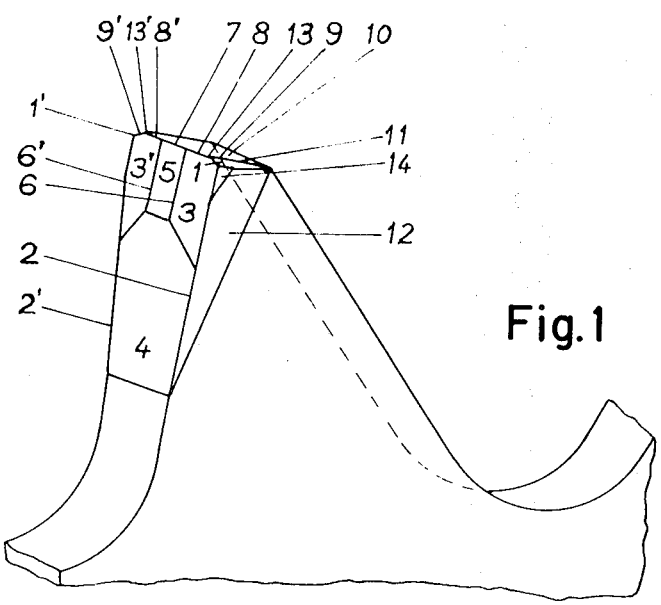
FIG. 1 is a perspective view of an improved tooth of a circular saw or side-milling cutter, the tooth being made according to and embodying this invention.
Figure 3:
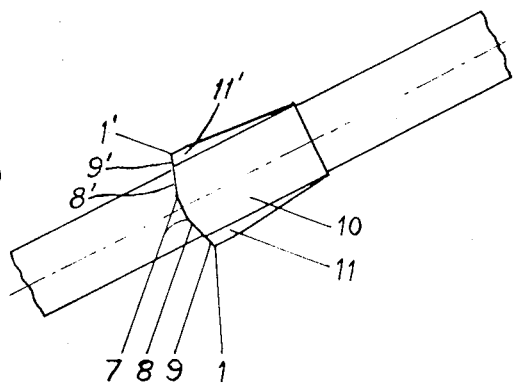
FIG. 3 is a top plan view of the tooth shown in FIG. 1 as it would be viewed looking radially toward the axis of rotation of the cutter.

The tooth structure is symmetrical about a center plane indicated by dash line C in FIGS. 3 and 4, such center plane being the plane of rotation of the cutter.

Generally, in the following description, a reference number without a prime symbol represents the tooth configuration on one side of the center line (the right side as it is viewed in FIG. 4) and the same reference number with a prime symbol would indicate the corresponding symmetrical part or feature on the opposite side of center plane C (the left side of FIG. 4).

In order to relieve the cutting-edge corners 1 and 1', the faces 3 and 3', adjacent to the secondary cutting-edges 2, 2' of the tooth, respectively, slant rearwardly from the edges 6 and 6'. The edges 6, 6' lie in the surface 4 and the surface 5, respectively, the edges 6 and 6' forming the upper limits of the face 4 and the lateral limits of surface 5. Relative to the middle plane of the tool, the edges 6 and 6' are slightly inclined or arranged in parallel to same. The cutting-edge corners 1 and 1' are, at the cutting motion in this way, trailing behind the principal cutting-edges 7, 8, 9, and 8', 9'.

The capacity for resistance of the cutting-edge corners 1, 1' is additionally increased by narrow surfaces 11 and 11' so that two principal cutting-edge corners 13 and 13' with obtuse corner-angles symmetrically relative to the middle plane of the saw blade are resulting which are coming to an engagement with a work-piece only after the stable middle principal cutting-edge 7 penetrates into the material to be removed by cutting.

Furthermore the tool is guided through the work by small additional secondary surfaces 14 and 14' lying about in parallel relative to the middle plane of the tool. Consequently, bending oscillations of the tool are to a large extent damped, the stress of the cutting edges of the tool considerably reduced, and the quality of the cut essentially improved.

I claim:

1. In a cutter such as a circular saw blade or side-milling cutter, a cutting tooth structure which includes: principal leading cutting edges 7, 8 and 8', and 9 and 9', at the radially outer edges of the tooth; trailing cutting-edge corners 1 and 1' flanking the aforesaid cutting edges at the lateral extremities of the tooth; and cutting edge corners 13 and 13' on opposite sides of the tooth located near but forwardly of said corners 1 and 1', respectively, at the intersection of cutting edges 8 and 9, and at the intersection of cutting edges 8' and 9', respectively; said trailing cutting edge corner 1 being at the intersection of tooth surfaces 3 and 14 and 11 on one side of the tooth, and the trailing cutting edge corner 1' being at the intersection of tooth surfaces 3' and 14' and 11' on the opposite side of the tooth; said cutting edge corner 13 being formed by the obtuse angle intersection of tooth faces 11 and 10 on one side of the tooth and with tooth face 3, and cutting edge corner 13' being formed on the opposite side of the tooth by the obtuse angle intersection of tooth faces 11' and 10 and with tooth face 3'; the corresponding aforesaid tooth surfaces defining both pairs of cutting corners being symmetrically arranged on opposite sides of the tooth relative to the central plane of the tooth.

References Cited

UNITED STATES PATENTS

| | | | |
|---|---|---|---|
| 543,608 | 7/1895 | Beale | 29—103 |
| 1,861,218 | 5/1932 | Huther | 29—103 X |
| 2,476,749 | 7/1949 | Marsh | 29—103 |
| 2,658,260 | 11/1953 | Hage | 29—103 |
| 2,671,947 | 3/1954 | Vander Linde | 29—103 |
| 2,720,229 | 10/1955 | Drake | 29—95 X |
| 3,169,435 | 2/1965 | Hartger | 29—103 X |
| 3,309,756 | 3/1967 | Segal | 29—95 |
| 3,358,720 | 12/1967 | Henderson | 143—133 |
| 3,362,446 | 1/1968 | Potomak | 143—133 |

HARRISON L. HINSON, Primary Examiner

U.S. Cl. X.R.

29—95; 143—133